C. BEARD.

Improvement in Bee Hives.

No. 122,697.  Patented Jan. 16, 1872.

Witnesses  
E. A. Bates.  
Villette Anderson.

Inventor  
Christian Beard,  
Chipman Hosmer & Co.  
Attys.

UNITED STATES PATENT OFFICE.

CHRISTIAN BEARD, OF WAYNESBOROUGH, VIRGINIA.

IMPROVEMENT IN BEE-HIVES.

Specification forming part of Letters Patent No. 122,697, dated January 16, 1872.

*To all whom it may concern:*

Be it known that I, CHRISTIAN BEARD, of Waynesborough, in the county of Augusta and State of Virginia, have invented a new and valuable Improvement in Bee-Hives; and I do hereby declare that the following is a full, clear, and exact description of the construction and operation of the same, reference being had to the annexed drawing making a part of this specification, and to the letters and figures of reference marked thereon.

Figure 1:
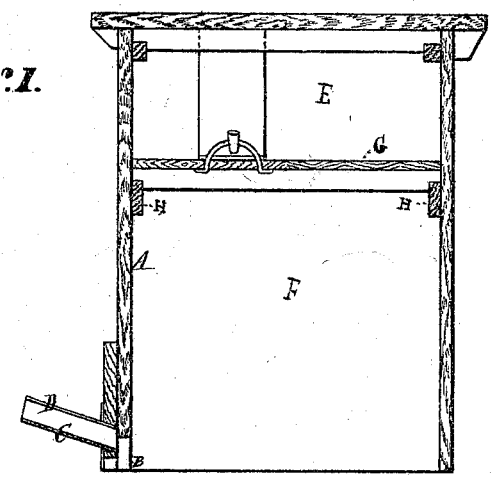
Figure 2:
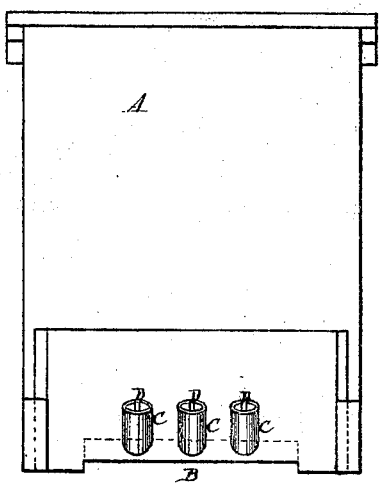

Figure 1 of the drawing is a representation of a central vertical section of my bee-hive. Fig. 2 is a front view.

This invention has relation to an improvement in bee-hives; and consists in the novel construction of devices to rid the hives of drones and other obnoxious and injurious insects.

In the accompanying drawing, A represents a hive; B, a low space under one side for the admission of the bees; C, small spouts projecting from the lower part of the hive and intended for the escape of drones and other insects. These tubes are open at the ends and formed with longitudinal slots, D, to admit the light which attracts the drones and induces them to pass out. The drones will not return to the hive through these tubes and cannot pass under the side space, which is only large enough to admit the honey-bees. This hive is divided into an upper and a lower apartment, marked, respectively, E and F. They are separated by a false bottom, G, resting on small strips H. The lower portion of the hive is for the bees to work in and make honey and comb for their own use. When desired the false bottom G may be taken out, allowing the bees to have access to the upper apartment. The honey made in this department may be removed for use. In winter the false lid may be removed and feed placed on top of the strips H to sustain the bees when there is danger of their starving. If the feed be put in the lower part of the hive stranger bees will attempt to rob it. The strips H are designed as substitutes for the ordinary comb-frames, being much simpler. They are supported at their ends by cleats, notched and attached to the sides of the hive.

I claim as my invention—

The inclined spouts C, constructed with open ends and longitudinal slots or openings D along their upper sides, and arranged in the manner and for the purpose described.

In testimony that I claim the above I have hereunto subscribed my name in the presence of two witnesses.

CHRISTIAN BEARD.

Witnesses:
FREDERIC DORSEY DELLINGER,
JOHN SUMMERFIELD MYERS. (9)